United States Patent
Parts et al.

(10) Patent No.: US 7,760,793 B2
(45) Date of Patent: Jul. 20, 2010

(54) PILOT SCRAMBLING ENABLING DIRECT PILOT SEQUENCE DETECTION IN INITIAL ACQUISITION IN EVOLVED UTRA

(76) Inventors: Ülo Parts, Alankotie 13 B 3, Helsinki (FI) 00730; Anders Østergaard Nielsen, Vesterbrogade 196, 3. th., Frederiksberg C (DK) 1800; Kaj Jansen, Salaistentie 36, Salo (FI) 24240

( * ) Notice: Subject to any disclaimer, the term of this patent is extended or adjusted under 35 U.S.C. 154(b) by 878 days.

(21) Appl. No.: 11/542,104

(22) Filed: Oct. 4, 2006

(65) Prior Publication Data
US 2007/0116166 A1 May 24, 2007

Related U.S. Application Data

(60) Provisional application No. 60/730,867, filed on Oct. 28, 2005.

(51) Int. Cl.
*H04L 27/30* (2006.01)
(52) U.S. Cl. .................. 375/145; 375/366; 375/368; 370/510; 370/513
(58) Field of Classification Search .............. 375/142, 375/143, 145, 149, 150, 343, 365–368; 370/331, 370/437, 461, 462, 491, 500, 509, 510, 512, 370/513; 455/436, 437, 438, 442
See application file for complete search history.

(56) References Cited

U.S. PATENT DOCUMENTS

| | | | |
|---|---|---|---|
| 7,173,958 B2 * | 2/2007 | Ho et al. .................. | 375/145 |
| 7,292,548 B2 * | 11/2007 | Lim et al. ................. | 370/328 |
| 7,308,258 B2 * | 12/2007 | Demir et al. .............. | 455/434 |
| 2007/0025428 A1 * | 2/2007 | Hahm et al. .............. | 375/149 |
| 2007/0183391 A1 * | 8/2007 | Akita et al. .............. | 370/350 |

OTHER PUBLICATIONS

NTT DoCoMo, NEC, SHARP; "*Physical Channels and Multiplexing in Evolved UTRA Downlink*"; 3GPP TSG RAN WG1 #42 on LTE; London Aug. 26-Sep. 2, 2005; R1-050707, pp. 1-15.

Tanno, M.; Higuchi, K.; Atarashi, H.; Sawahashi, M.; "*Experiments On Three-Step Fast Cell Search Algorithm Employing Common Pilot Channel For OFCDM Broadband Packet Wireless Access In Forward Link*"; Vehicular Technology Conference, 2004. VTC2004-Fall. 2004 IEEE 60th, vol. 2, Iss., Sep. 26-29, 2004; pp. 968-973 vol. 2.

Wang, Y.-P.E.; Ottosson, T.; "*Cell Search Algorithms and Optimization In W-CDMA*"; Vehicular Technology Conference Proceedings, 2000. VTC 2000-Spring Tokyo. 2000 IEEE 51st, vol. 1, Iss., 2000; pp. 81-86 vol. 1.

(Continued)

*Primary Examiner*—Dac V Ha
(74) *Attorney, Agent, or Firm*—Knobbe, Martens, Olson & Bear LLP

(57) ABSTRACT

A communications network and method thereof include a base station controller configured to provide a repetition period of a primary synchronization channel to be equal to a predetermined integer value times a scrambling code length of the scrambling code of a common pilot channel. A user equipment in the network is configured to search for a known sequence comprising the primary synchronization channel to select a cell and a corresponding sub-frame/symbol timing from the selected cell.

16 Claims, 6 Drawing Sheets

OTHER PUBLICATIONS

P,X Nokia; "*Eutra Cell Search for Initial Synchronization and Neighbor Cell Identification*"; 3GPP TSG RAN WG1 #44; Denver Feb. 13-17, 2006; R1-060289, pp. 1-8.

International Search Report PCT/IB2006/002976 filed Oct. 23, 2006.

R1-051147 Basic Structure of Control Channel and Synchronization Channel for Scalable Bandwidth in Evolved UTRA Downlink, NTT DoCoMo, Fujitsu, Mitsubishi Electric Corporation, NEC, Panasonic, SHARP, Toshiba Corporation, 3GPP TSG-RAN WG1 Meeting #42bis, Oct. 10-14, 2005, pp. 1-13.

R1-051057 Downlink Synchronization Channel Schemes for E-UTRA, Texas Instruments, 3GPP TSG-RAN WG1 Meeting #42bis, Oct. 10-14, 2005, pp. 1-12 (discussion) and pp. 1-20 (slide show).

R1-051156 Proposal for the Downlink Synchronization Channel for E-UTRA, Nortel 8.3, 3GPP TSG-RAN1 Meeting #42bis, San Diego, USA, Oct. 10-14, 2005, pp. 1-12.

\* cited by examiner

PILOT SCRAMBLING ENABLING DIRECT PILOT SEQUENCE DETECTION IN INITIAL ACQUISITION IN EVOLVED UTRA

REFERENCE TO RELATED APPLICATIONS

This application claims priority of U.S. Provisional Patent Application Ser. No. 60/730,867, filed Oct. 28, 2006. The subject matter of this earlier filed application is hereby incorporated by reference.

BACKGROUND OF THE INVENTION

1. Field of the Invention

This invention is related to a design and arrangement of a Common Pilot Channel (CPICH) and a Primary Synchronization Channel (P-SCH) in Evolved Universal Mobile Telecommunications System Terrestrial Radio Access (UTRA).

2. Description of the Related Art

A mobile station (or wireless device) routinely performs a cell search (or synchronization) function to detect and acquire the base stations of a wireless network in the vicinity of the wireless device. Fast detection of the base stations is critical to the performance of both the mobile station and the wireless network, particularly in the new $3^{rd}$ Generation Partnership Project (3GPP) Evolved UTRA wireless system. Fast detection of base stations allows a mobile station to access a wireless network more rapidly, for instance, by reducing acquisition delay. Fast detection of base stations also enables the mobile station and the wireless network to perform faster handoffs between base station cell sites or between sectors of the same base transceiver subsystem (BTS) of a base station. Additionally, fast detection reduces the number of calls that are dropped during the handoff process.

Correlation procedures are used for a wide range of tasks in a mobile radio receiver. For instance, a receiver receives a signal including data. In a correlation process, the data is compared, in the form of sample values, with a sequence of data items, which are known in the receiver. If the arriving data matches the sequence of known data, a correlation signal is emitted which indicates that the sequence of known data items has been identified in the received signal.

By way of example, time-slot synchronization in the receiver is carried out on the basis of the correlation of a pilot signal with a pilot sequence which is known in the receiver. In a Universal Mobile Telecommunications System (UMTS) Standard, the synchronization signal for the time-slot synchronization is transmitted via a P-SCH (Primary Synchronization Channel). A synchronization sequence, which is known in the receiver, has a length of 256-chip codeword, and is transmitted at a start of each time slot.

Frame synchronization is likewise carried out by correlation of a transmitted pilot signal with a known pilot sequence. In the UMTS Standard, the code sequence for frame synchronization and code group acquisition is transmitted via a S-SCH (Secondary Synchronization Channel). The spreading factor for the second code sequence is likewise 256 chips. A third example of the use of correlation procedures for carrying out a mobile radio task relates to an estimation of a delay time for one transmitted signal propagation path. Owing to multipath propagation in mobile radio systems, one and the same transmitted signal is received with a time offset at the receiver, and with different attenuation levels, via different propagation paths. In the course of an equalization process, the time offset between the individual signal components must be measured and must be compensated for using, for instance, delay estimation. The estimation of the delay time on the propagation path, which is also referred to as delay estimation, is carried out using a product correlation sequence comprising a scrambling code, a channelization code, and pilot symbols.

The time-slot and frame synchronizations are used to search for new (mobile radio) cells in the so-called active set (group of currently used cells) and in a so-called monitor set (group of monitored cells which are candidates for the active set). Time-slot and frame synchronizations must, therefore, be carried out continually even when telephone connection has already been set up. An analogous procedure applies, of course, for delay estimation, which must be continually updated on the basis of changing channel conditions.

A Common Pilot Channel (CPICH) code can be detected directly after Primary Synchronization Channel (P-SCH) detection by correlating all possible pilot sequences with received CPICH. However, the complexity of that procedure may be high due to a long scrambling code (compared to the repetition period of the P-SCH) of, for instance, 10 ms. This implies that, a user equipment (UE) has to deal with the uncertainty of both the scrambling code number and the phase of the scrambling code, which either increases the complexity of the UE or increases the CPICH search time.

In another conventional system, an intermediate step is added between the P-SCH and CPICH detection which uses a Secondary Synchronization Channel (S-SCH). However, conventional systems do no allow for arranging the P-SCH and CPICH in order to make CPICH detection with as much low implementation complexity as possible. A system and method are needed that would allow cell specific scrambling of the CPICH to be applied without the need for the S-SCH.

SUMMARY OF THE INVENTION

In accordance with an embodiment of the present invention, there is provided a communications network, including a network element configured to provide a repetition period of a primary synchronization channel to be equal to a predetermined integer value times a scrambling code length of a scrambling code of a common pilot channel, and a user equipment configured to search for a known sequence including the primary synchronization channel to select a cell and a corresponding sub-frame/symbol timing from the selected cell.

In accordance with an embodiment of the present invention, there is provided a communications network, including network element means for providing a repetition period of a primary synchronization channel to be equal to a predetermined integer value times a scrambling code length of a scrambling code of a common pilot channel, and user equipment means for searching for a known sequence including the primary synchronization channel to select a cell and a corresponding sub-frame/symbol timing from the selected cell.

In accordance with an embodiment of the present invention, there is provided a network element in a cell site, including a controller configured to generate a repetition period of a primary synchronization channel to be equal to a predetermined integer value times a scrambling code length of a scrambling code of a common pilot channel, and a transmitter configured to output the primary synchronization channel with the repetition period to a user equipment.

In accordance with an embodiment of the present invention, there is provided a network element in a cell site, including controller means for generating a repetition period of a primary synchronization channel to be equal to a predetermined integer value times a scrambling code length of a scrambling code of a common pilot channel, and transmitter means for outputting the primary synchronization channel with the repetition period to a user equipment.

In accordance with an embodiment of the present invention, there is provided a user equipment in a cell site, including a first selector configured to select a carrier frequency candidate from a set of carrier frequencies, a search unit configured to search for a known sequence including a primary synchronization channel received from a network element, and a second selector configured to select a cell and a corresponding sub-frame/symbol timing based on the search for the known sequence.

In accordance with an embodiment of the present invention, there is provided a user equipment in a cell site, including first selector means for selecting a carrier frequency candidate from a set of carrier frequencies, search means for searching for a known sequence including a primary synchronization channel received from a network element, and second selector means for selecting a cell and a corresponding sub-frame/symbol timing based on the search for the known sequence.

In accordance with an embodiment of the present invention, there is provided a method and a computer program embodied on a computer readable medium of a communications network, including providing a repetition period of a primary synchronization channel to be equal to a predetermined integer value times a scrambling code length of a scrambling code of a common pilot channel, searching for a known sequence including the primary synchronization channel, and selecting a cell and a corresponding sub-frame/symbol timing from the selected cell.

In accordance with an embodiment of the present invention, there is provided a method and a computer program embodied on a computer readable medium of a network element in a cell site, including generating a repetition period of a primary synchronization channel to be equal to a predetermined integer value times a scrambling code length of a scrambling code of a common pilot channel, and outputting the primary synchronization channel with the repetition period to a user equipment.

In accordance with an embodiment of the present invention, there is provided a method and a computer program embodied on a computer readable medium of a user equipment in a cell site, including selecting a carrier frequency candidate from a set of carrier frequencies, searching for a known sequence including a primary synchronization channel received from a network element, and selecting a cell and a corresponding sub-frame/symbol timing based on the searching for the known sequence.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

In accordance with an embodiment of the present invention, there is provided a system and method in which a Common Pilot Channel (CPICH) and a Primary Synchronization Channel (P-SCH) are arranged in Evolved UTRA, being standardized under 3GPP UTRA Long Term Evolution. P-SCH is mainly used for cell search purposes, which is primarily initial cell search, but also neighbor cell synchronization prior to handover measurements. The Primary Synchronization Channel (P-SCH) may be also referred to as a Common Synchronization Channel in 3GPP. The main purpose of the Common pilot channel (CPICH) is to perform a channel estimation which is a basic measurement for any detection algorithm. The Common pilot channel (CPICH) may also be referred to as Reference Symbols in 3GPP. Also, Scrambling Code may be referred as Pilot Sequence in 3GPP.

In one embodiment, the present invention relates to E-UTRA (Evolved Universal Mobile Telecommunications System Terrestrial Radio Access) systems, currently being evaluated and standardized for the long term evolution of Wideband Code Division Multiple Access (WCDMA) technology. In accordance with an embodiment of the present invention, a system and a method of the present invention are configured to arrange the P-SCH and the CPICH, in order to perform CPICH detection with as low implementation complexity as possible. In one embodiment, the cell specific scrambling of the CPICH may be applied without the need for a Secondary Synchronization Channel (S-SCH).

Figure 1:
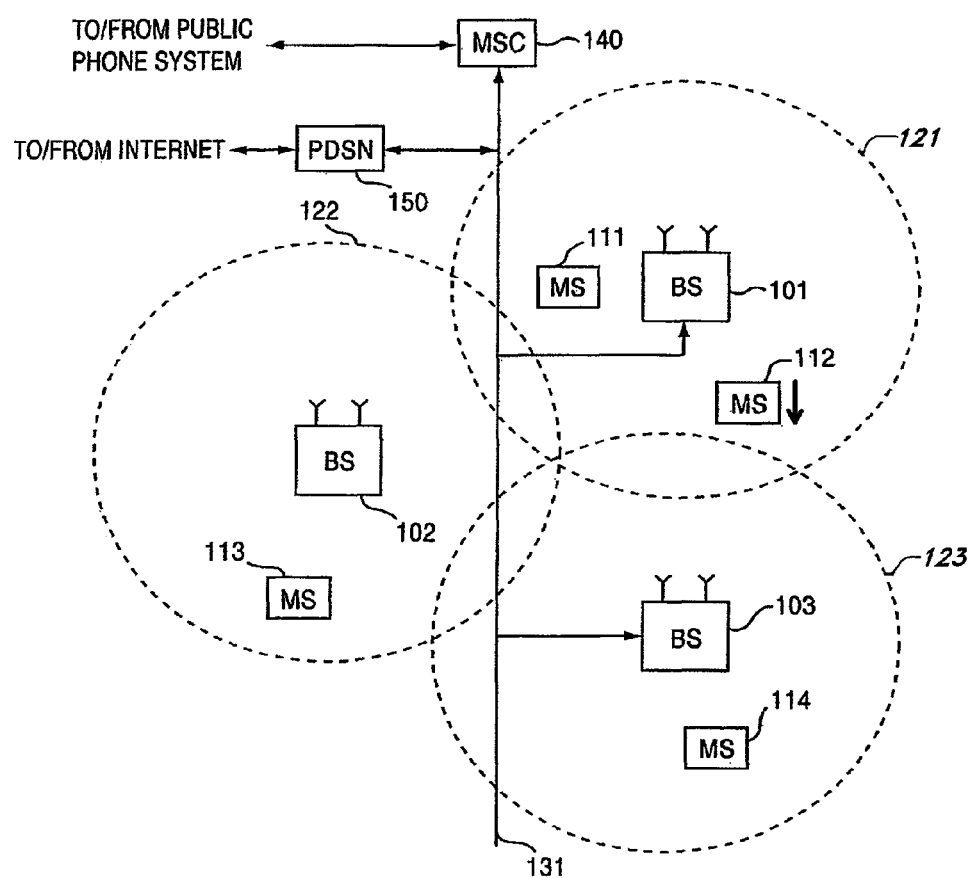
FIG. 1 illustrates an exemplary wireless network, in accordance with an embodiment of the present invention.

FIG. 1 illustrates exemplary a wireless network 100, in accordance with an embodiment of the present invention. The wireless network 100 comprises a plurality of cell sites 121, 122, and 123, each containing a base station (BS) 101, BS 102, and BS 103, respectively. BS 101 and 103 communicate with mobile stations (MS) 111 and 114 over channels according to the Evolved UTRA. The MS 111 and 114 may be any suitable user equipment or wireless device, including conventional cellular radiotelephones, PCS handset devices, personal digital assistants, portable computers, or metering devices. A person of ordinary skill in the art will appreciate that other types of access terminals other than mobile devices may be used, including fixed wireless terminals.

Dotted lines show the approximate boundaries of the cell sites 121, 122, and 123 in which base stations 101, 102, and 103 are located. The cell sites are shown approximately circular for the purposes of illustration and explanation only. A person of ordinary skill in the art will appreciate that the cell sites often have other irregular shapes, depending on the cell configuration selected and natural and man-made obstructions.

As is well known in the art, cell sites 121, 122, and 123 include a plurality of sectors (not shown), each being illuminated by a directional antenna coupled to the base station. The embodiment of FIG. 1 illustrates the BSs 101, 102, and 103 in the center of each corresponding cell. Alternate embodiments position the directional antennas in corners of the sectors. The system of the present invention is not limited to any particular cell site configuration.

In one embodiment of the present invention, BS 101, BS 102, and BS 103 each may include a base station controller (BSC) and one or more base transceiver subsystem(s) (BTS). The BSC and the BTS subsystems are well known to those skilled in the art. The BSC is a device that manages wireless communications resources, including the base transceiver stations, for specified cells within a wireless communications network. The BTS comprises the RF transceivers, antennas, and other electrical equipment located in each cell site.

BS 101, BS 102 and BS 103 transfer voice and data signals between each other and the public switched telephone network (PSTN) (not shown) and the Internet via communication line 131, mobile switching center (MSC) 140, and packet data serving node (PDSN) 150. MSC 140 is a switching device that provides services and coordination between the subscribers in a wireless network and external networks, such as the PSTN or Internet. BS 101, BS 102 and BS 103 transmit or send signals to MS 111 and 114 over channels according to the Evolved UTRA. The signal may include a Primary-Synchronization Channel (P-SCH) and/or a scrambling code of the common pilot channel (CPICH). The scrambling code or the scrambling code of the CPICH may also be referred to as a pilot sequence.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

Evolved UTRA is a system with frequency re-use=1, that is, several cells are transmitting at the same carrier frequency. In the Evolved UTRA, a user equipment (UE) or a mobile station (MS) must acquire the best cell with the minimum path loss between the cell and the target UE or MS. This initial cell acquisition process is called cell search. Accordingly, the pilot sequence of CPICH has to be scrambled by cell specific scrambling code in order to ensure good channel estimation in the presence of inter-cell interference. Furthermore, the pilot scrambling code uniquely identifies the BS.

Accordingly, for initial cell search, the MS 111 or 114 searches through a set of potential carrier frequencies. For a certain carrier frequency candidate, the MS 111 or 114 searches for a known sequence (P-SCH), in order to select a cell, and select the corresponding subsub-frame/symbol timing from the selected cell. The cell is then identified by detecting a cell specific sequence of pilot symbols, i.e., the CPICH, transmitted by the wireless network 100. CPICH detection should be possible with a reasonable amount of computing. The computing needs are determined by the amount of available possibilities that should be tried out.

Thus, each one of MS 111 and 114 routinely performs cell searches to detect the base stations of a wireless network in the vicinity of the mobile stations. Whenever one of MS 111 and 114 is turned on, an initial cell search is performed in order to search for and acquire at least one of base stations 101 and 103 of wireless network 100. Thereafter, each MS 111 and 114 continues to perform cell searches in order to determine the strongest base station(s) in the vicinity and to identify available base stations to which the mobile station may be transferred in case it is necessary to perform a handoff. To improve the efficiency of these cell searches, the present invention provides a base station controller (e.g., BS 110, 102, 103) configured to align a length of scrambling code of CPICH with a repetition period of the P-SCH. In accordance with an embodiment of the present invention, the repetition period of the P-SCH may be equal to a predetermined value, such as an integer, times the scrambling code length of the CPICH.

Figure 2:
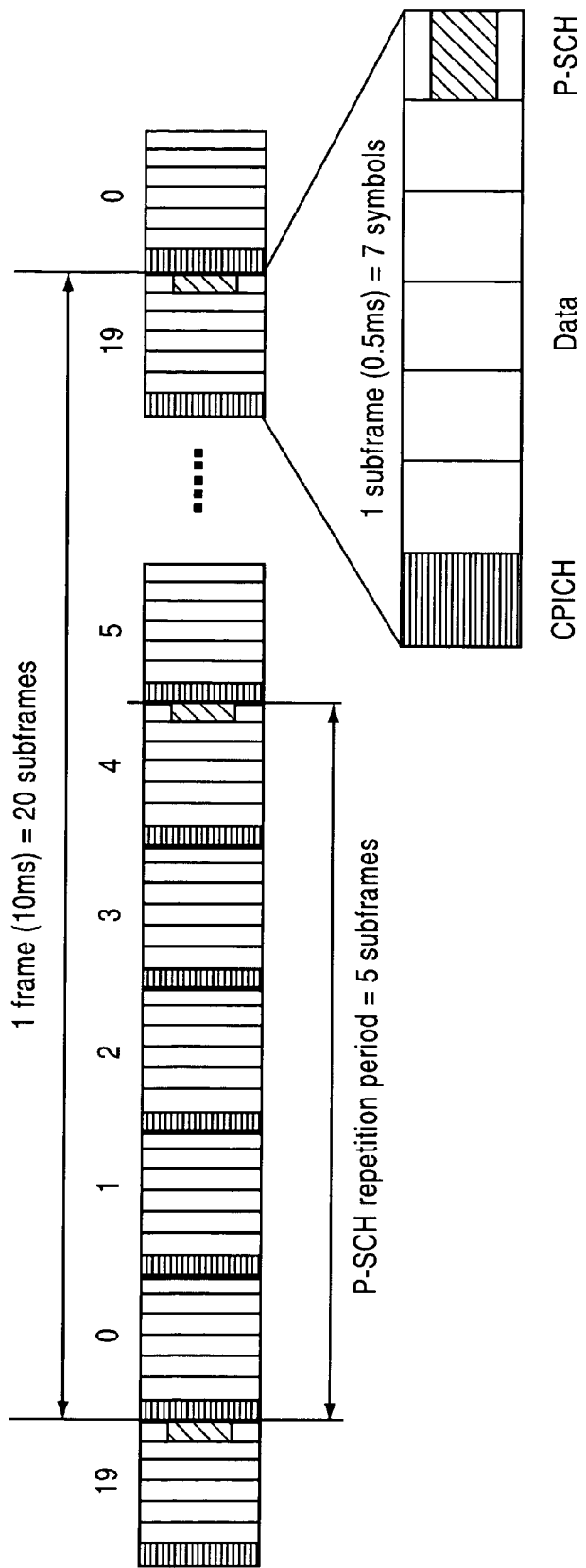
FIG. 2 a structure of a frame, in accordance with an embodiment of the present invention.

The present invention assumes that P-SCH is located at a fixed symbol position within a sub-frame and that this sub-frame containing the P-SCH is repeated with a fixed period. In one embodiment, the P-SCH is the last symbol of the sub-frame and it is repeated in every 5th sub-frame. A frame of, for instance, 10 ms, may include 20 sub-frames of 0.5 ms. The sub-frame may include seven symbols. Thus, as illustrated in FIG. 2, the 4.sup.th sub-frame, the 9.sup.th sub-frame, the 14sub-frame, and the 19.sup.th sub-frame include the P-SCH as the last symbol. According to an embodiment of the present invention, the CPICH scrambling code may start with a fixed time offset relative to the P-SCH. In one example, the CPICH scrambling code may start in the first symbol of the next sub-frame after P-SCH (see FIG. 3). Thus, the phase of the scrambling code is known and, therefore, the UE CPICH detection algorithm would only identify which cell specific scrambling code that is applied.

Figure 3:
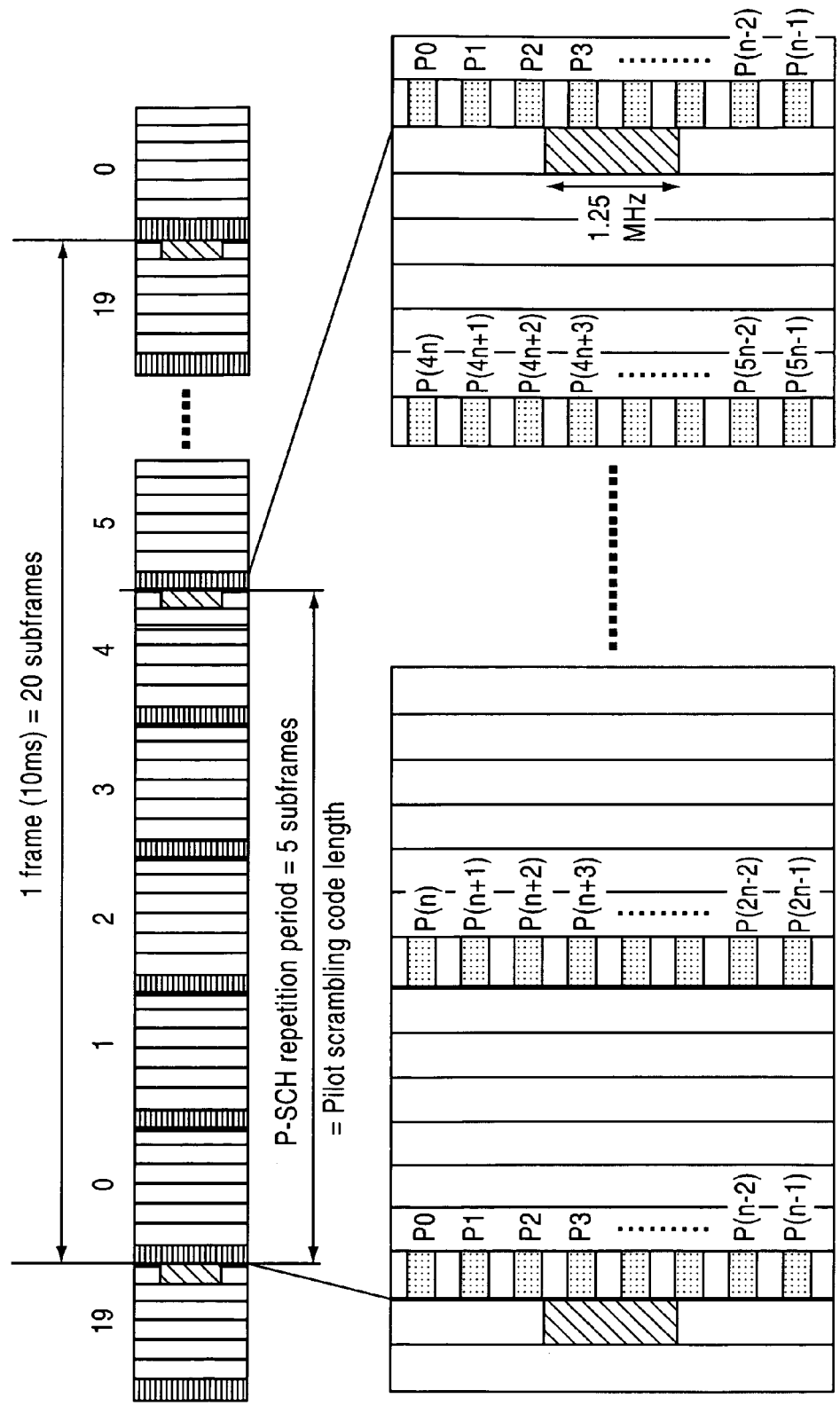
FIG. 3 illustrates an exemplary primary synchronization channel (P-SCH), in accordance with an embodiment of the present invention.
Figure 4:
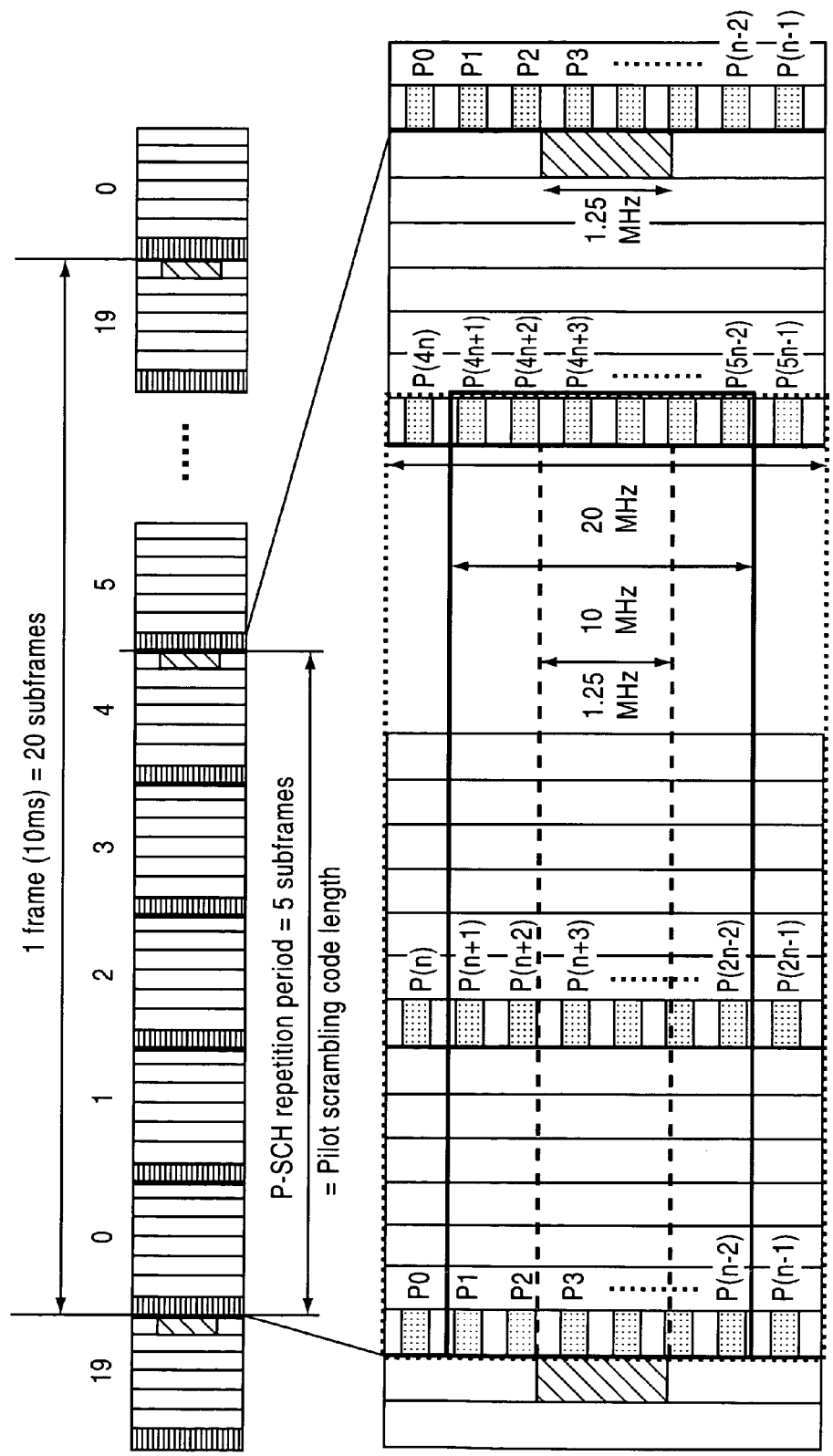
FIG. 4 illustrates a method for a common control pilot channel (CPICH) scrambling code design for different bandwidths, in accordance with an embodiment of the present invention.

In one example, as illustrated in FIG. 3, the P-SCH may be transmitted at a lowest bandwidth of, for instance, 1.25 MHz. During initial synchronization, the P-SCH is searched, for instance by correlating the received signal with a local time-domain replica of the P-SCH and selecting the timing with maximum power of the correlation results. Based on the found P-SCH, the position of the symbol in the sub-frame with the CPICH can be determined, as well as the phase of the scrambling cod; due to the unambiguous relation between P-SCH timing and the CPICH scrambling code phase. In an exemplary embodiment, the P-SCH is always transmitted in the lowest bandwidth (e.g. 1.25 MHz) despite the deployed bandwidth, and the CPICH scrambling code is arranged so that the center 1.25 MHz frequency part is always the same for all deployment bandwidths, as depicted in FIG. 4. Therefore, if the mobile station is configured to the minimum bandwidth (e.g. 1.25 MHz) then the P-SCH and a center part of CPICH detection may be done without knowing the operating bandwidth of the network. The CPICH detection may be performed by correlating (in time or frequency domain) the incoming received signal at pilot symbol locations with local replicas of all or a set of the CPICH scrambling codes. The scrambling code that maximizes the power of the correlation is selected as the estimate of the CPICH scrambling code applied. FIG. 4 illustrates the CPICH scrambling code arrangement for different bandwidths, in accordance with an embodiment of the present invention.

Figure 5:
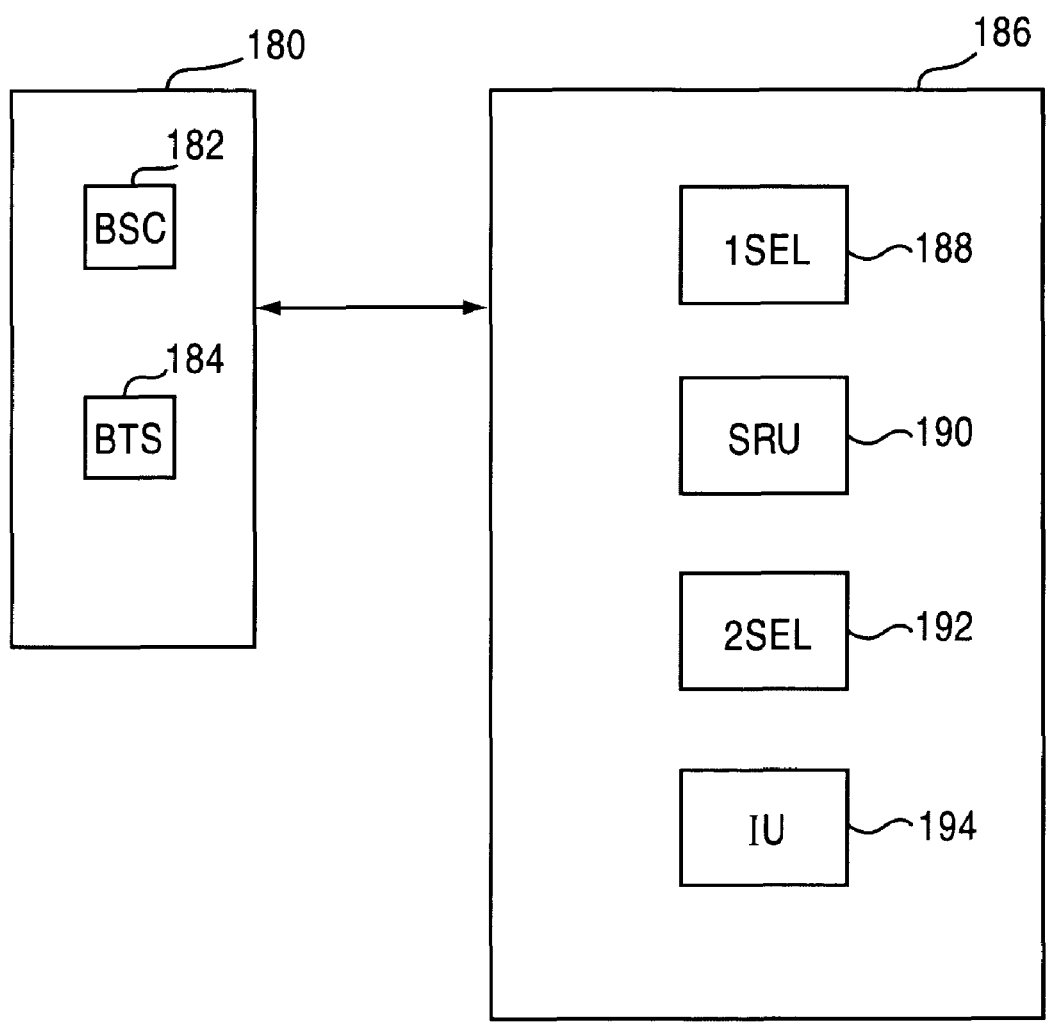
FIG. 5 illustrates a base station and a user equipment or mobile station in a wireless communication network, in accordance with an embodiment of the present invention.

FIG. 5 illustrates a base station 180 and a user equipment or mobile station 186 in a wireless communication network, in accordance with an embodiment of the present invention, performing the functions described above. The base station 180 may include a base station controller 182 and one or more base transceiver subsystem(s) 184. The base station controller 182 may also provide a repetition period of the P-SCH to be equal to a predetermined value, such as an integer, times the scrambling code length of the CPICH. The base station controller 182 would also align a length of scrambling code of the CPICH with the repetition period of the P-SCH. The base station controller 182 may be further configured to provide a cell specific sequence of pilot symbols of the common pilot channel, i.e. the common pilot channel is scrambled by a cell specific scrambling code. The base transceiver subsystem(s) 184 may be configured to output the P-SCH with a certain repetition period to the user equipment 186.

A first selector 188 in the user equipment 186 may be configured to select a carrier frequency candidate from a set of carrier frequencies, and a search unit 190 would be configured to search for the known sequence including the P-SCH received from the base transceiver subsystem(s) 184 in the base station 180. A second selector 192 may be configured to select the cell and a corresponding sub-frame/symbol timing based on the search, and, based on the scrambling by the scrambling code of the CPICH, an identifying unit 194 may be configured to identify the selected cell by detecting the cell specific sequence of pilot symbols of the CPICH (scrambling code). The identifying unit 194 may be configured to identify the cell specific scrambling code of the common pilot channel based on search results derived from the P-SCH only, the S-SCH only, or both the P-SCH and the S-SCH.

Figure 6:
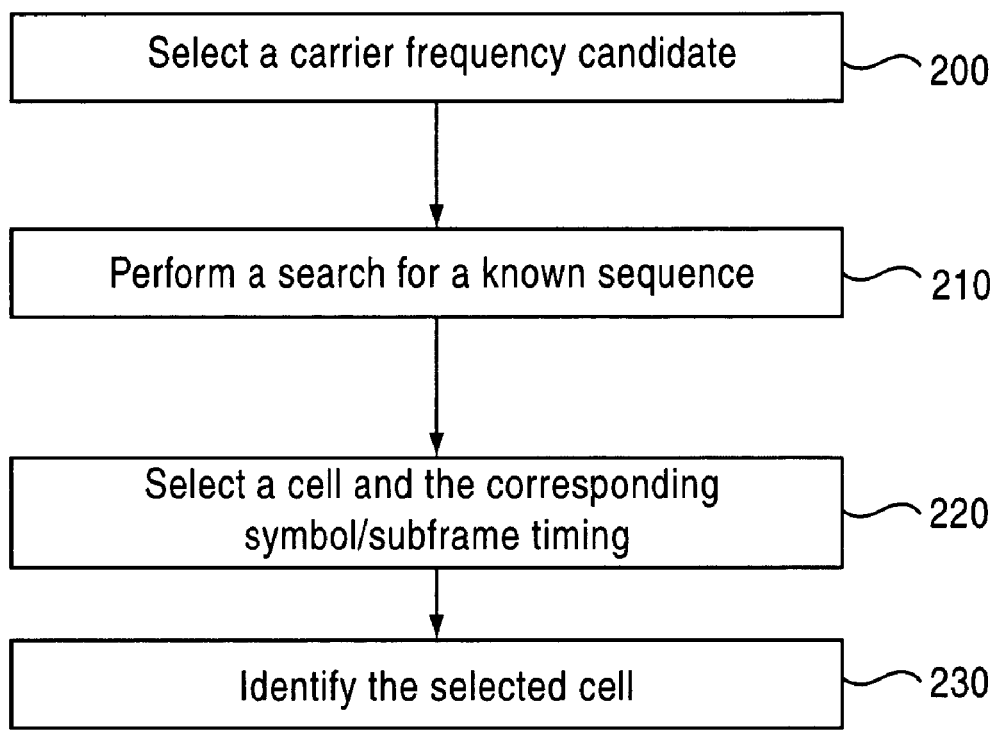
FIG. 6 illustrates a cell search method, in accordance with an embodiment of the present invention.

FIG. 6 illustrates a cell search method, in accordance with an embodiment of the present invention. At step 200, a carrier frequency candidate is selected. At step 210, a search is performed for a known sequence. At step 220, a cell and the corresponding symbol/sub-frame timing are selected. At step 230, the selected cell is identified.

It is to be understood that in the embodiment of the present invention, the operations are performed in the sequence and manner as shown although the order of some operations and the like may be changed without departing from the spirit and scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

With respect to the present invention, network elements may be any device that utilizes network data, and can include switches, routers, bridges, gateways or servers. In addition, while the terms packet and datagram have been used in the description of the present invention, the invention has import to many types of network data. For purposes of this invention, the term data includes packet, cell, frame, datagram, bridge protocol data unit packet, packet data, and any equivalents thereof.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A user equipment, comprising:
    a first selector configured to select a carrier frequency candidate from a set of carrier frequencies;
    a search unit configured to search for a known sequence including a primary synchronization channel received from a network element, wherein a repetition period of the primary synchronization channel is equal to a predetermined integer value times a scrambling code length of a scrambling code of a common pilot channel; and
    a second selector configured to select a cell and a corresponding sub-frame/symbol timing based on the search for the known sequence.

2. The user equipment as recited in claim 1, wherein the user equipment further comprises:
    an identifying unit configured to identify the selected cell by detecting a cell specific sequence of pilot symbols based on a scrambling by the scrambling code of the common pilot channel.

3. The user equipment as recited in claim 2, wherein the identifying unit is further configured to identify the cell specific scrambling code of the common pilot channel based on search results derived from the primary synchronization channel, a secondary synchronization channel, or the primary and secondary synchronization channels.

4. The user equipment as recited in claim 2, wherein the identifying unit is further configured to identify the cell specific scrambling code of the common pilot channel based on search results derived only from the primary synchronization channel.

5. The user equipment as recited in claim 2, wherein the identifying unit is further configured to identify the cell specific scrambling code of the common pilot channel based on search results derived from the primary synchronization channel and without deriving information from a secondary synchronization channel.

6. The user equipment as recited in claim 1, wherein the predetermined integer value is 1.

7. The user equipment as recited in claim 1, wherein the repetition period of the primary synchronization channel is aligned with the length of the scrambling code of the common pilot channel.

8. A user equipment, comprising:
    first selector means for selecting a carrier frequency candidate from a set of carrier frequencies;
    search means for searching for a known sequence including a primary synchronization channel received from a network element, wherein a repetition period of the primary synchronization channel is equal to a predetermined integer value times a scrambling code length of a scrambling code of a common pilot channel; and
    second selector means for selecting a cell and a corresponding sub-frame/symbol timing based on the search for the known sequence.

9. The user equipment as recited in claim 8, wherein the predetermined integer value is 1.

10. The user equipment as recited in claim 8, wherein the repetition period of the primary synchronization channel is aligned with the length of the scrambling code of the common pilot channel.

11. A method of a user equipment, comprising:
    selecting a carrier frequency candidate from a set of carrier frequencies;
    searching for a known sequence including a primary synchronization channel received from a network element, wherein a repetition period of the primary synchronization channel is equal to a predetermined integer value times a scrambling code length of a scrambling code of a common pilot channel; and
    selecting a cell and a corresponding sub-frame/symbol timing based on the searching for the known sequence,
    wherein the method is implemented by at least one computing device.

12. The method as recited in claim 11, wherein the predetermined integer value is 1.

13. The method as recited in claim 11, wherein the repetition period of the primary synchronization channel is aligned with the length of the scrambling code of the common pilot channel.

14. A computer program embodied on a computer readable medium of a user equipment, the computer program being configured to perform:

selecting a carrier frequency candidate from a set of carrier frequencies;

searching for a known sequence including a primary synchronization channel received from a network element, wherein a repetition period of the primary synchronization channel is equal to a predetermined integer value times a scrambling code length of a scrambling code of a common pilot channel; and selecting a cell and a corresponding sub-frame/symbol timing based on the searching for the known sequence.

15. The computer program as recited in claim 14, wherein the predetermined integer value is 1.

16. The computer program as recited in claim 14, wherein the repetition period of the primary synchronization channel is aligned with the length of the scrambling code of the common pilot channel.

* * * * *

UNITED STATES PATENT AND TRADEMARK OFFICE
CERTIFICATE OF CORRECTION

PATENT NO. : 7,760,793 B2
APPLICATION NO. : 11/542104
DATED : July 20, 2010
INVENTOR(S) : Parts et al.

It is certified that error appears in the above-identified patent and that said Letters Patent is hereby corrected as shown below:

At Col. 1, line 8, please delete "2006." and insert --2005.--.

At Col. 2, line 27, please delete "no" and insert --not--.

At Col. 4, line 18, please delete "be also" and insert --also be--.

At Col. 5, line 46, please delete "subsub-frame" and insert --sub-frame--.

At Col. 6, line 8, please delete "5th" and insert --$5^{th}$--.

At Col. 6, line 11, please delete "4.sup.th" and insert --$4^{th}$--.

At Col. 6, line 11, please delete "9.sup.th" and insert --$9^{th}$--.

At Col. 6, line 12, please delete "14sub-frame," and insert --$14^{th}$ sub-frame,--.

At Col. 6, line 12, please delete "19.sup.th" and insert --$19^{th}$--.

At Col. 6, line 29, please delete "cod;" and insert --code,--.

Signed and Sealed this

Twenty-first Day of December, 2010

David J. Kappos
*Director of the United States Patent and Trademark Office*